United States Patent
Cincinelli et al.

(10) Patent No.: US 6,836,413 B2
(45) Date of Patent: Dec. 28, 2004

(54) CURRENT-POWERED CONVERTED WITH ENERGY RECOVERY CLAMPING CIRCUIT

(76) Inventors: Lorenzo Cincinelli, Via Alcide de Gasperi 35, 52023 Levane, Arezzo (IT); Sauro Macerini, Via Perugia 6, 52023 Levane, Arezzo (IT)

( * ) Notice: Subject to any disclaimer, the term of this patent is extended or adjusted under 35 U.S.C. 154(b) by 0 days.

(21) Appl. No.: 10/463,210

(22) Filed: Jun. 17, 2003

(65) Prior Publication Data

US 2004/0042236 A1 Mar. 4, 2004

(51) Int. Cl.$^7$ .............................................. H02M 3/335
(52) U.S. Cl. ..................................... 363/16; 363/56.01
(58) Field of Search ............................. 363/16, 17, 40, 363/55, 56.01, 131, 132

(56) References Cited

U.S. PATENT DOCUMENTS

| | | | | |
|---|---|---|---|---|
| 5,038,267 A | * | 8/1991 | De Doncker et al. | 363/89 |
| 5,172,309 A | * | 12/1992 | DeDoncker et al. | 363/132 |
| 5,280,421 A | * | 1/1994 | De Doncker et al. | 363/98 |
| 5,303,137 A | * | 4/1994 | Peterson | 363/16 |
| 5,828,559 A | * | 10/1998 | Chen | 363/56 |
| 6,452,815 B1 | * | 9/2002 | Zhu et al. | 363/17 |
| 2003/0039128 A1 | * | 2/2003 | Cohen | 363/20 |
| 2003/0198064 A1 | * | 10/2003 | Zhu et al. | 363/21.01 |

* cited by examiner

*Primary Examiner*—Adolf Berhane
(74) *Attorney, Agent, or Firm*—Waddey & Patterson, P.C.; Jason L. Hornkohl

(57) ABSTRACT

A current-powered converter includes a current source, a switching section connected to the output of the converter, a dispersed inductance being provided between the switching section, and the converter output. A clamping circuit limits the voltage at the input of the switching section. The clamping circuit comprises a capacitor in which energy is stored during at least one phase of the switching cycle of the switching section, and an inductance by means of which the energy stored in said capacitor is returned to the output of the converter.

6 Claims, 2 Drawing Sheets

CURRENT-POWERED CONVERTED WITH ENERGY RECOVERY CLAMPING CIRCUIT

APPLICATION FOR UNITED STATES LETTERS PATENT

This application claims benefit of co-pending European Patent Application Serial No. 02425388.2 filed Jun. 17, 2002, entitled "Current-Powered Converter with Energy Recovery Clamping Circuit" which is hereby incorporated by reference.

Be it known that we, Lorenzo Cincinelli, a citizen of Italy, residing at Via Alcide De Gasperi 35, 52023 Levane, Arezzo Italy; Sauro Macerini, a citizen of Italy, residing at Via Perugia 6, 52023 Levane, Arezzo Italy; have invented a new and useful "Current-Powered Converter with Energy Recovery Clamping Circuit."

BACKGROUND OF THE INVENTION

The present invention relates to a current-powered converter comprising a direct-current source which powers a switching section connected to a transformer which transfers power to a load via the output of the converter, or more generally a switching section connected to the output of the converter via a circuitry which has a dispersed inductance.

In current-powered converters, during the switching cycle of the switches in the switching section, situations occur where the voltage at the input of the switching section increases owing to the dispersed inductance of the transformer provided between the switching section and the converter output. Similar situations may also occur in the presence of dispersed inductances due to other circuit components and therefore in the absence of the output transformer. In order to avoid the occurrence of excessive voltages at the terminals of the electronic switches of the switching section, voltage limiting circuits—typically called clamping circuits—are used.

SUMMARY OF THE INVENTION

An object of the present invention is to provide a clamping circuit which is particularly simple and which allows recovery of the energy stored during the operative phase of the circuit such that it can be returned during a suitable phase of the switching cycle of the switches of the switching section.

Essentially, the clamping circuit according to the invention comprises a capacitor, in which energy is stored during at least one phase of the switching cycle of the converter, and an inductance, by means of which the energy stored in the capacitor is returned to the output of the converter.

Basically, according to one embodiment of the invention, a unidirectional component, typically a diode, is arranged in series with the capacitor. The diode and the capacitor in series are arranged between the positive terminal and the negative terminal on the input side of the switching section. Moreover, a branch comprising the inductance and a controlled switch, which is closed in order to transfer energy to the load, is arranged in parallel with the diode. Switching of the switch is controlled so that it is closed when the switching section is in a phase where it transfers energy to the output of the converter, i.e. to the load, and when the voltage at the terminals of the capacitor is equal to at least a reference voltage.

When the controlled switch is closed, the capacitor is electrically connected to the inductance so as to allow transfer, to the inductance, of the energy stored during the previous phase in the electrical field of the capacitor. The energy is then transferred from the inductance across the switching section and therefore toward the load.

According to another embodiment of the invention, a second unidirectional re-circulating component, typically a diode, is arranged in parallel with the controlled switch and the capacitor of the clamping circuit, said component preventing the occurrence of over-voltages when the controlled switch is opened.

Switching of the controlled switch is triggered by a switching circuit which prevents closing of the controlled switch until the voltage at the terminals of the capacitor of the clamping circuit has reached a predetermined value. When this value has been reached, the switching circuit causes the controlled closing and opening of the switch depending on the switching conditions of the switching section. In this way, it is ensured that the clamping circuit enters into operation only when a relatively high voltage is present at the terminals of the capacitor. This ensures the possibility of recovery of the energy by causing a relatively low current to flow through the inductance, thereby limiting the losses. Moreover, keeping the current values across the inductance low allows the use of an inductance which has small dimensions and therefore is not very bulky and is low-cost, resulting in advantages in terms of the size and cost of the entire circuit.

Further advantageous features and embodiments of the converter according to the invention are indicated in the accompanying drawings and will be described with reference to a non-limiting example of embodiment of the invention.

DESCRIPTION OF THE PREFERRED EMBODIMENTS

Figure 1:
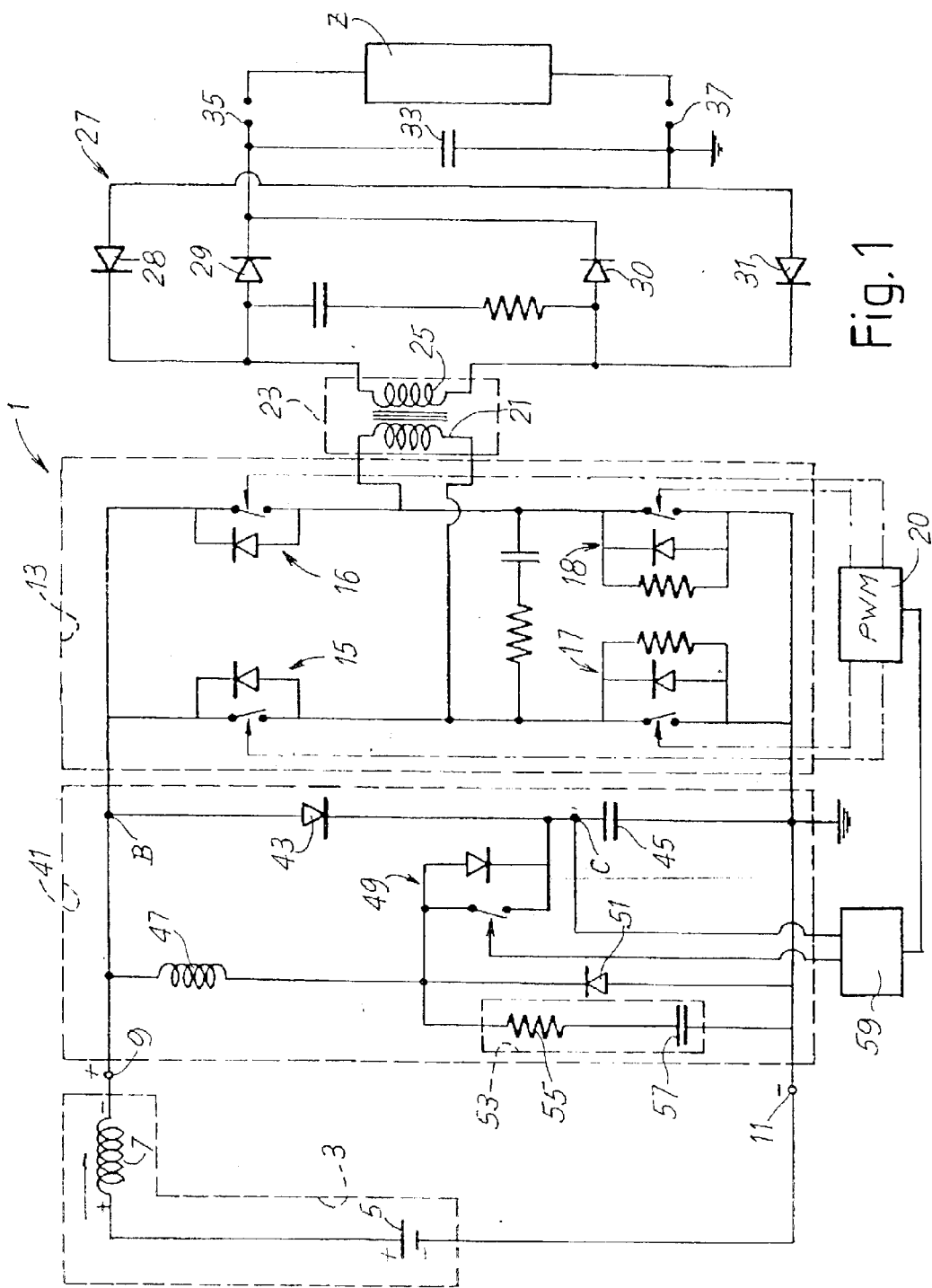
FIG. 1 shows a circuit diagram of the converter according to the invention.

With initial reference to FIG. 1, the converter, which is generally denoted by 1, has a current source which is indicated overall by 3 and schematically represented in the form of a voltage source 5 in series with an inductance 7. The source 3 is connected to the input terminals 9, 11 of a switching section which is denoted overall by 13 and which in this example of embodiment has a full bridge structure, but could have a different configuration. 15, 16, 17 and 18 denote the four electronic switches of the bridge of the switching section 13. The electronic switches may also consist of a MOSFET, transistor or combinations thereof or any other electronic device suitable for use as a controlled switch. Each switch 15, 16, 17 and 18 is shown with its associated diode. The electronic switches 15,16,17,18 are controlled by a drive circuit of a type known per se and schematically indicated by 20. It must be understood that the switching section may also have a different configuration, for example of the half bridge type, the configuration of the converter shown in this embodiment described here being only an example.

The primary winding 21 of a transformer 23 is connected to the bridge 15, 16, 17 and 18, the secondary winding thereof being indicated by 25. The secondary winding 25 is connected at its ends to a rectifier bridge 27, the respective diodes of which are schematically indicated by 28, 29, 30 and 31. At the output of the diode bridge 27 there is a smoothing capacitor 33 which ensures that a substantially continuous current is present at the output terminals 35, 37 of the converter, to which the load generally denoted by Z is applied.

A clamping circuit, denoted overall by 41, is inserted between the current source 3 and the switching section 13, said circuit having the function which will be described below.

As is known, during the switching cycle of the switches 15, 16, 17 and 18, a phase occurs where all the switches are closed. During this phase, no current circulates inside the primary winding 21 of the transformer. When the switches 16, 17 or 15, 18 are opened during the following phase of the switching cycle, current starts to flow through the winding 21 of the transformer 23. Owing to the dispersed inductance of the transformer 23, said switching upon opening of the two switches results in a sudden increase in the input voltage to the switching section 1, i.e. an increase in the voltage at the point B indicated in the diagram according to FIG. 1. The clamping circuit 41 has the object of keeping the voltage VB of the point B within a predetermined value, thus avoiding possible damage to the components of the switching section 13.

The clamping circuit 41 comprises a first branch containing a first diode 43 in series with a capacitor 45, consisting in this case of a single capacitor. An inductance 47 is arranged in parallel with the diode 43, said inductance being in series with a controlled switch 49 shown schematically with its associated diode. The controlled switch 49 may be a MOSFET or any other component suitable for performing the function described below. The controlled closing of the switch 49 connects the capacitor 25 to the inductance 47. A second diode 51 having the function of a recirculating or flywheel diode is arranged between the inductance 47 and the negative input terminal 11 of the switching section 13. In parallel with the said diode there is an (optional) branch 53 comprising a resistor 55 in series with a capacitor 57, the branch 53 having the function of damping the voltage oscillations. 59 denotes schematically the circuit for controlling switching of the switch 49, which circuit is also connected at C to a plate of the capacitor 45. As will become clear below, the voltage VC at the point C is kept at a substantially constant value by means of the control circuit 59.

When, owing to the succession of phases in the switching cycle of the switches 15, 16, 17 and 18, the voltage VB at the point B tends to increase, the clamping circuit 41 ensures that the voltage at this point is kept at a value controlled and determined by the voltage VC at the point C. In fact, when the voltage VB exceeds the value of the voltage VC, the diode 43 starts to conduct, causing part of the current I supplied by the current course 3 to flow towards the capacitance consisting of the capacitor 45. The latter therefore stores an electric charge and thus a corresponding energy in the form of an electric field between the plates of the capacitor. The capacitance of the capacitor 45 (which may in reality consist of a set of capacitors) is calculated in such a way that, during the normal switching interval where the voltage VB is greater than a predetermined value, the voltage VC at the point C remains substantially unvaried, or undergoes a negligible increase. When the dispersed inductance of the transformer 23 has been charged and therefore all the current supplied by the current source 3 is able to flow across the winding 21, the diode 43 is disabled again.

At this point it is possible to recover the energy stored in the capacitance consisting of the capacitor 45 and supply it to the load Z connected to the output 35, 37 of the converter. For this purpose, the control circuit 59 closes the switch 49, connecting electrically the capacitor 45 to the inductance 47. The charge stored by the capacitor 45 is discharged across the inductance 47. The energy stored in the form of an electric field of the capacitor 45 is converted into energy of the magnetic field generated by the inductance 47 and is finally directed back to the load Z via the transformer 23. This energy recovery phase takes place temporarily in one of the phases where the switches 15–18 are located in a switching state such as to transfer the energy to the output of the converter, i.e. in a phase where current is flowing across the primary winding 21 of the transformer 23.

Closing of the switch 49 is therefore controlled depending on the switching signal of the circuit 20 for switching the switches 15, 16, 17 and 18. Moreover, since the voltage VC at the point C must be kept at a predetermined value, closing of the controlled switch 49 is prevented by the control circuit 59 until the voltage at the point C has reached the predefined value. This transient situation occurs for example upon energization of the converter. During this transient, the controlled switch 49 remains open for the whole time necessary for charging the capacitor 45 until the voltage VB reaches the desired value.

The recirculating diode 51 provided between the controlled switch 49 and the negative terminal 11 ensures that current also flows across the inductance 47 when the switch 49 is open. This on the one hand prevents the occurrence of overvoltages at the terminals of the inductance 47 when the controlled switch 49 is open and on the other hand reduces the losses. Opening of the controlled switch 49 is triggered by the circuit 59 slightly in advance of the moment when the switches 15, 16, 17 and 18 are switched into a condition such that the transformer 23 no longer transfers energy to the load.

Figure 2:
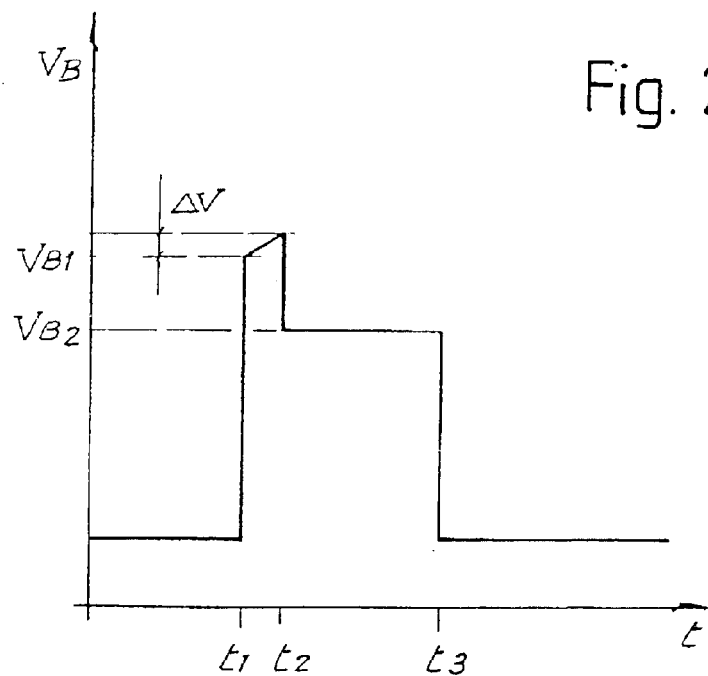
FIG. 2 shows a diagram of the progression, over time, of the voltage at the input of the switching section of the converter.

FIG. 2 shows in schematic form the progression of the voltage VB at the point B as a function of the time. At the instant t1 switching of the switches 15, 16, 17 and 18 occurs, causing, from a situation where there is no current passing through the primary winding 21, the start of a current flow across this winding. For example at the instant t1 there may be a transition from a situation where the four switches 15, 16, 17 and 18 of the bridge are closed to a situation where the switches 15 and 18 are open. The voltage at the point VB increases rapidly from a substantially zero value to a value VB1 equal to the fixed voltage VC set at the point C, less the voltage drop on the diode 43. Between the time instant t1 and the time instant t2 the diode 43 remains in the conductive state and the voltage at the points B and C remains substantially unvaried, except for a slight increase ΔV due to the charge stored in the high-capacity capacitor 45. At the instant t2 the dispersed inductance of the transformer 23 has been completely charged and the diode 43 is disabled. The voltage VB falls to the value VB2 and remains at this value up to the instant t3 which then triggers renewed switching of the switches 15, 16, 17 and 18 of the switching section 13, resetting to zero the voltage VB. During the interval t2–t3 it is possible to discharge the energy stored by the capacitance of the capacitor 45, across the inductance 47 to the output of the converter. For this purpose the switch 49 is closed and is opened again slightly in advance of the instant t3.

Figure 3:
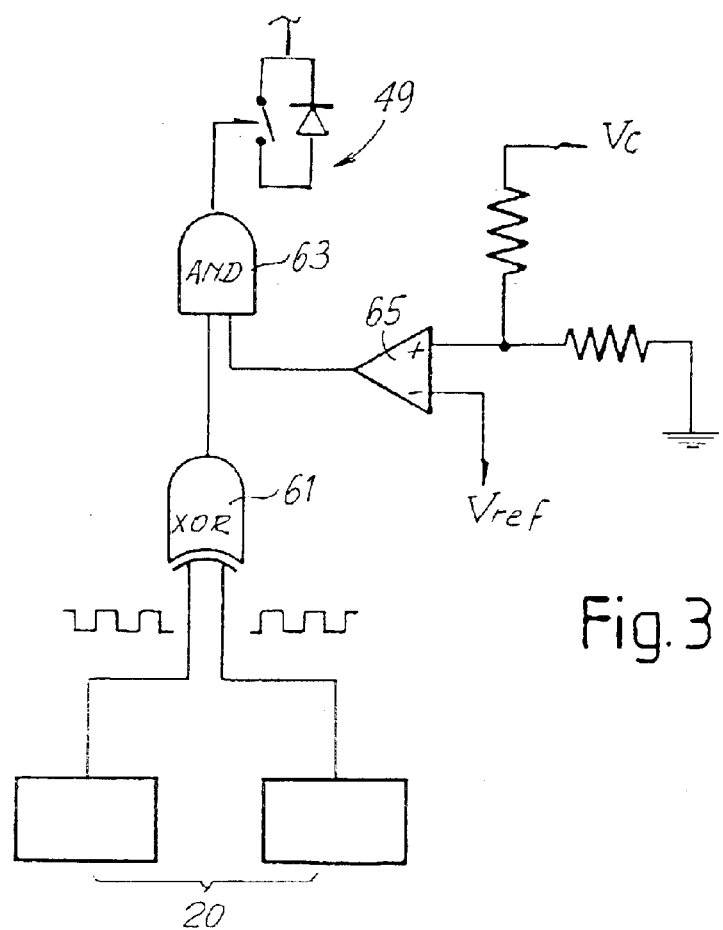
FIG. 3 shows a block diagram of the switching circuit of the switch contained in the clamping circuit of the converter according to FIG. 1.

FIG. 3 schematically shows a possible basic configuration of the control circuit 59. 20 also represents in schematic form the drive circuit which causes switching of the switches 15, 16, 17 and 18. The switching signals generated by the drive circuit 20 are applied to the two inputs of an exclusive OR (XOR) logic gate 61. The output of the gate 61 is connected to one of the inputs of an AND logic gate 63, the second input of which receives the output signal of a comparator 65. The comparator has at its input a reference voltage Vref and a voltage proportional to the value of the voltage VC at the point C. Consequently the switching signal supplied by the gate 61 and resulting from the combination of the signals supplied by the circuit 20 is able to control closing and opening of the switch 49 only when the voltage VC has reached a preset value, depending on the reference voltage Vref. With this arrangement the switch 49 remains open for all the time required for the voltage VC to reach the desired value. Said value will be as high as possible, in keeping with the need to avoid damage to the electronic components of the converter 1, in order to maximize the amount of energy which can be recovered.

Thus, although there have been described particular embodiments of the present invention of a new and useful Current-Powered Converter with Energy Recovery Clamping Circuit, it is not intended that such references be construed as limitations upon the scope of this invention except as set forth in the following claims.

It is understood that the drawing shows only one possible embodiment of the invention, the forms and arrangements of which may vary, without departing from the scope of the idea forming the basis of the invention.

What is claimed is:

1. A current-powered converter comprising:
   a current source;
   a switching section connected to an output of the converter, a dispersed inductance being provided between the switching section and the converter output;
   a clamping circuit operative to limit a voltage at an input of the switching section; and
   said clamping circuit comprising a capacitor in which energy is stored during at least one phase of a switching cycle of said switching section, and an inductance by means of which the energy stored in said capacitor is returned to the output of the converter.

2. The converter according to claim 1 further comprising a transformer connected to the output of the converter, the transformer having a dispersed inductance, and said switching section is connected to the transformer wherein said inductance comprises the dispersed inductance of said transformer.

3. The converter according to claim 2 further comprising:
   a first unidirectional component in series with said capacitor, said capacitor and said unidirectional component being arranged between a positive terminal and a negative terminal on an input side of said switching section; and
   in parallel with said first unidirectional component, a controlled switch arranged in series with said inductance; said controlled switch being closed when the switching section is in a phase where energy is transferred to the converter output and a capacitor voltage across said capacitor is at least equal to a reference voltage, and closing of said controlled switch connecting said capacitor to said inductance.

4. The converter according to claim 3, said first unidirectional component connecting the positive input terminal of the switching section to said capacitor when the input voltage of said switching section increases beyond said reference voltage.

5. The converter according to claim 4 further comprising a second unidirectional component in parallel with a circuit branch containing said controlled switch in series with said capacitor, said unidirectional component operative to prevent an over-voltage when the controlled switch is opened.

6. The converter according to claim 5 further comprising a switching circuit operatively coupled to said controlled switch, the switching circuit functional to prevent closing of said controlled switch until the capacitor voltage has reached a predetermined value;
   after the capacitor voltage reaches the predetermined value, the switching circuit is operative to close and open said controlled switch depending on switching conditions of the switching section, causing closing of the controlled switch when the switching section transfers energy to the converter output and keeping the controlled switch open when the switching section does not transfer energy to the converter output.

* * * * *

UNITED STATES PATENT AND TRADEMARK OFFICE
CERTIFICATE OF CORRECTION

PATENT NO. : 6,836,413 B2  Page 1 of 1
APPLICATION NO. : 10/463210
DATED : December 28, 2004
INVENTOR(S) : Cincinelli et al.

It is certified that error appears in the above-identified patent and that said Letters Patent is hereby corrected as shown below:

On the Title Page, item (54), and Col. 1, line 1, replace "CONVERTED" with --CONVERTER--

On the Title Page insert item (73) the assignee should be listed as --Magnetek S.P.A.--

Signed and Sealed this

Twenty Second Day of April, 2008

JON W. DUDAS
*Director of the United States Patent and Trademark Office*